(12) United States Patent
Terase et al.

(10) Patent No.: US 6,764,539 B2
(45) Date of Patent: Jul. 20, 2004

(54) HARDENABLE COMPOSITION WITH HIGH STORAGE STABILITY CONTAINING SCALY SILICA PARTICLES AND PROCESS FOR ITS PRODUCTION

(75) Inventors: Kunihiko Terase, Fukuoka (JP); Masaki Inoue, Fukuoka (JP); Atsunari Fujii, Fukuoka (JP); Eiichi Ono, Fukuoka (JP); Takayoshi Sasaki, Fukuoka (JP)

(73) Assignees: Asahi Glass Company, Limited, Tokyo (JP); Dohkai Chemical Industry Co., Ltd., Kitakyusyu (JP)

( * ) Notice: Subject to any disclaimer, the term of this patent is extended or adjusted under 35 U.S.C. 154(b) by 129 days.

(21) Appl. No.: 10/099,971

(22) Filed: Mar. 19, 2002

(65) Prior Publication Data

US 2002/0174805 A1 Nov. 28, 2002

(30) Foreign Application Priority Data

Mar. 19, 2001 (JP) ........................................ 2001-077343

(51) Int. Cl.[7] ............................................... B01J 35/02
(52) U.S. Cl. .......................... 106/3; 106/481; 106/482; 516/111; 516/214; 516/405; 516/418; 516/923
(58) Field of Search ............................ 106/3, 481, 482, 106/737; 516/214, 111, 405, 418, 923

(56) References Cited

FOREIGN PATENT DOCUMENTS

| JP | 11-011927 | * | 1/1999 |
|----|-----------|---|--------|
| JP | 11-029317 | * | 2/1999 |

* cited by examiner

Primary Examiner—Archene Turner
(74) Attorney, Agent, or Firm—Oblon, Spivak, McClelland, Maier & Neustadt, P.C.

(57) ABSTRACT

A process for producing a hardenable composition with high storage stability containing scaly silica particles which consist essentially of foliar secondary silica particles and have a laminated structure, said process comprising:

Figure 1:
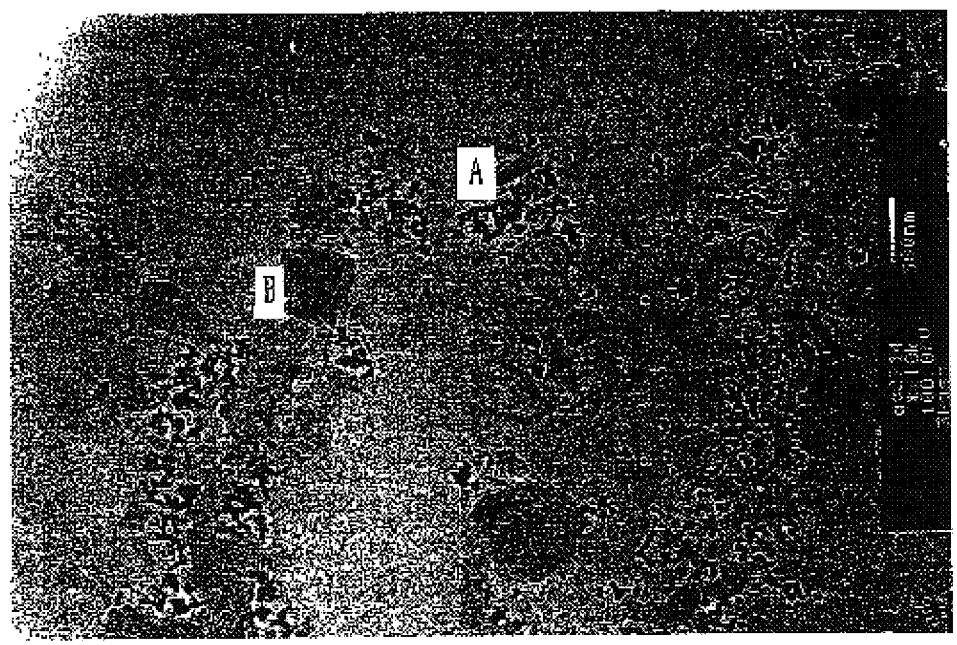

(1) a step of subjecting a silica sol, a silica hydrogel or hydrous silicic acid to hydrothermal treatment in the presence of an alkali metal salt to form tertiary agglomerated particles of the scaly silica in the form of porous three-dimensional disorderly agglomerates of foliar secondary silica particles, each secondary particle being formed by a parallel face-to-face alignment of a plurality of flaky primary particles which are overlaid one on another, and (2) a step of disintegrating and dispersing the tertiary agglomerated particles of silica in an organic polymer in the form of an aqueous emulsion by a wet method.

21 Claims, 1 Drawing Sheet

HARDENABLE COMPOSITION WITH HIGH STORAGE STABILITY CONTAINING SCALY SILICA PARTICLES AND PROCESS FOR ITS PRODUCTION

The present invention relates to an aqueous hardenable composition with high storage stability (sedimentation resistance) containing foliar secondary silica particles and an organic polymer and a process for its production.

The present inventors previously proposed an aqueous hardenable composition containing mutually independent scaly silica particles having a laminated structure, consisting essentially of foliar secondary silica particles, each formed by a parallel face-to-face alignment of a plurality of flaky primary silica particles which are overlaid one on another, and a film-forming organic polymer (for example, Japanese Patent Application JP11-351182).

The secondary silica particles having a laminated structure in the hardenable composition were developed by the present inventors for the first time, and when incorporated in an organic coating in the form of an aqueous emulsion of an organic polymer such as an acrylic resin, an epoxy resin or a urethane resin to give an aqueous hardenable composition, they can impart excellent properties such as water resistance, acid resistance, alkali resistance and weather resistance to the resulting film by virtue of their unique shape and physical properties. In addition, because these particles themselves essentially have an excellent film-forming property, they overlie one on another orientationally in a coating film and therefore can impart a high level of hardness and strong adhesion to the substrate to the coating film.

However, unfortunately, the aqueous hardenable composition containing these foliar secondary silica particles and organic polymer particles sometimes separates during long-term stationary storage in storage vessels, sedimenting the foliar secondary silica particles as a concentrate. Especially, the sedimentation is remarkable when the viscosity of the hardenable composition is low.

The aqueous hardenable composition is useful as a coating composition for outer walls of structures such as buildings and bridges, a floor polish composition for floors of commercial facilities such as supermarkets, department stores and hotels. For commercial use as a coating on outer walls of structures or floors of large commercial facilities as described above, the hardenable composition is usually stored, shipped and supplied in vessels of 100 L to 200 L like metal drums. If the foliar secondary silica particles sediment at the bottom of such a large vessel as a metal drum while it is stored in a warehouse and/or shipped by sea, the vessel has to be shaken again to disperse the particles again. However, it is very tough for painters at the site of coating to shake up or stir up the silica particles in such a vessel to disperse them uniformly in the composition again. After all, such containers as large as metal drums are fairly heavy and can not be handled like containers for household use of several hundreds of milliliters to several liters which are easy to shake in one or two hands.

Thus, there is a strong demand among users of the hardenable composition for high storage stability that keeps the composition in a highly dispersed state during storage and shipping by preventing sedimentation of the foliar secondary silica particles as a concentrate. However, as a matter of fact, it is not easy to impart and realize such storage stability.

Obviously, it is known to those skilled in the art that particles are unlikely to sediment in a slurry when they are pulverized to smaller sizes. However, if the foliar secondary silica particles in the present invention are just mechanically pulverized by force to smaller sizes, the problem that the scaly silica suffers damage to the delicate laminated structure characteristic of the foliar secondary silica particles each composed of a parallel face-to-face alignment of a plurality of flaky primary silica particles arises. With such foliar secondary silica particles having a damaged laminated structure, storage stability may be imparted, but at the expense of part or all of the intrinsic film-forming property which is the most important characteristic. Therefore, the hardenable composition loses much of its advantage.

Even if an aqueous slurry of tertiary agglomerated particles of scaly silica (ternary particles of scaly silica in the form of porous three-dimensional disorderly agglomerates of foliar secondary silica particles, each of which is composed of a parallel face-to-face alignment of a plurality of flaky primary silica particles) is supplied to a wet system pulverizing apparatus (disintegrator) repeatedly by circulating (recycling) the aqueous slurry through the pulverizer as many as ten or twenty times in an attempt to disintegrate the tertiary silica particles into foliar secondary silica particles as disclosed in Japanese Patent Application JP11-351182 and Japanese Patent Application JP2000-206264, the tertiary particles just disintegrate insufficiently to foliar secondary silica particles with particle sizes of about 0.5 $\mu$m at the best (according to laser diffraction/light scattering particle size distribution analysis) which retain their laminated structure. Thus, it has been difficult to completely prevent sedimentation during stationary storage. It is presumed that an aqueous slurry containing foliar secondary silica particles having an average particle size smaller than the above-mentioned value is not likely to be obtained consistently by repetitious feeding into a pulverizer because when the particle size are reduced to a certain level, the disintegrated foliar secondary silica particles start to agglomerate again to avoid further disintegration.

The object of the present invention is to provide an aqueous hardenable composition with high storage stability (sedimentation resistance) containing foliar secondary silica particles and an organic polymer and a process for its production.

Namely, the present invention provides:

(1) A process for producing a hardenable composition with high storage stability containing scaly silica particles which consist essentially of foliar secondary silica particles and have a laminated structure, said process comprising:

(i) a step of subjecting a silica sol, a silica hydrogel or hydrous silicic acid to hydrothermal treatment in the presence of an alkali metal salt to form tertiary agglomerated particles of the scaly silica in the form of porous three-dimensional disorderly agglomerates of foliar secondary silica particles, each secondary particle being formed by a parallel face-to-face alignment of a plurality of flaky primary particles which are overlaid one on another, and (ii) a step of disintegrating and dispersing the tertiary agglomerated particles of silica in an organic polymer in the form of an aqueous emulsion by a wet method.

(2) A process for producing a hardenable composition with high storage stability containing scaly silica particles which consist essentially of foliar secondary silica particles and have a laminated structure, said process comprising:

(i) a step of subjecting a silica sol, a silica hydrogel or hydrous silicic acid to hydrothermal treatment in the presence of an alkali metal salt to form tertiary agglomerated particles of the scaly silica in the form of porous three-dimensional disorderly agglomerates of foliar secondary silica particles, each secondary particle being formed by a parallel face-to-face alignment of a plurality of flaky primary particles which are overlaid one on another, (ii) a step of disintegrating and dispersing the tertiary agglomerated particles of silica to foliar secondary silica particles by a wet method, and (iii) a step of disintegrating and dispersing the foliar secondary silica particles in an organic polymer in the form of an aqueous emulsion by a wet method.

(3) A hardenable composition with high storage stability having scaly silica particles having a laminated structure consisting essentially of foliar secondary silica particles each of which is formed by a parallel face-to-face alignment of a plurality of flaky primary particles which are overlaid one on another, and fine particles of an organic polymer well dispersed in an aqueous medium, wherein the composition does not substantially sediment the secondary silica particles as a concentrate in a test for storage stability of a coating stipulated in JIS K5400.

FIG. 1 is a transmission electron micrograph of particles in the hardenable composition of the present invention.

Now, the present invention is described in detail.

Preparation of Silica Agglomerates (Tertiary Particles)

The process for producing a hardenable composition of the present invention starts with a step of forming tertiary agglomerated particles of scary silica.

Namely, in the step, tertiary agglomerated particles of scaly silica in the form of porous three-dimensional disorderly agglomerates of foliar secondary silica particles, each secondary particle being formed by a parallel face-to-face alignment of a plurality of flaky primary particles which are overlaid one on another, are formed by subjecting a silica sol, silica hydrogel or hydrous silicic acid to hydrothermal treatment in the presence of an alkali metal salt.

When the starting material is a silica sol, a silica sol containing a silica source and an alkali source in prescribed amounts is used. As the silica sol, it is preferred to use a silica sol obtained by dealkalizing an aqueous alkali metal silicate solution having a silica/alkali molar ratio ($SiO_2$/$Me_2O$, wherein Me is an alkali metal such as Li, Na or K; the same applies hereinafter) of from 1.0 to 3.4 mol/mol by ion exchange with a resin or by electrodialysis. A preferable aqueous alkali metal silicate solution may be obtained, for example, by diluting water glass with a suitable amount of water.

The silica/alkali molar ratio ($SiO_2$/$Me_2O$) of the silica sol is preferably within a range of from 3.5 to 20 mol/mol, more preferably within a range of from 4.5 to 18 mol/mol. Further, the silica concentration of the silica sol is preferably from 2 to 20 mass %, more preferably from 3 to 15 mass %.

The particle size of the silica in the silica sol, in terms of average particle size, is preferably at most 100 nm, though it is not particularly limited. In particular, so-called active silicic acid having a particle size of at most 20 nm is preferred. Though the lower limit of the particle size is particularly limited, it is preferably at least 1.0 nm. If the particle size exceeds 100 nm, the stability of the silica sol tends to deteriorate undesirably.

The method for measuring the silica particle size is not particularly limited so long as such particle size can be measured. For example, it can be measured by particle size distribution analysis using a Coulter counter, a laser/scattering particle size distribution analyzer, or a dynamic light-scattering particle size analyzer, or by measuring sizes of particle images in a transmission electron microphotograph with a scale.

As described above, a silica sol as the starting material is subjected to hydrothermal treatment in a heating pressure vessel such as an autoclave under heating to form tertiary agglomerated particles of silica in the present invention.

Any type of autoclave may be used without special restrictions as long as it is equipped at least with a heating means and a stirring means, and preferably equipped further with a thermometric means.

Further, prior to charging the silica sol into an autoclave for the hydrothermal treatment, purified water such as deionized water or distilled water may be added to adjust the silica concentration within a desired range.

The hydrothermal treatment is carried out preferably within a temperature range of from 150 to 250° C., more preferably from 170 to 220° C., in order to increase the reaction rate as far as possible and to minimize the progress of crystallization.

The time required for the hydrothermal treatment may vary depending upon the temperature for the hydrothermal treatment or the presence or absence of seed crystals, but it is usually from 3 to 50 hours, preferably from 3 to 40 hours, more preferably from 5 to 25 hours.

It is preferred, though not essential, to add seed crystals in an amount of from about 0.001 to 1 mass % for efficient hydrothermal treatment within a shorter time. As such seed crystals, silica-X, silica-Y or the like may be used as it is or after pulverization, as the case requires.

After completion of the hydrothermal treatment, the hydrothermal treatment product is taken out from the autoclave, filtered and washed with water. The particles after washing with water preferably have a pH of from 5 to 9, more preferably from 6 to 8, when slurried with water at 10 mass %.

Use of a silica hydrogel as the starting material is also possible and preferable because tertiary agglomerated particles of silica such as silica-X or silica-Y are produced in a high yield at a low temperature in a short reaction time without formation of crystals such as quartz (JP-A-2000-72432).

Silica hydrogel particles as the silica hydrogel may be spherical or have irregular shapes and may be formed by an appropriately selected granulation method.

For example, spherical silica hydrogel may be formed by solidifying silica hydrosol into a spherical shape in a medium such as a petroleum solvent, but it is preferably formed by ejecting a sol formed by mixing an aqueous alkali metal silicate solution and an aqueous mineral acid solution into a medium gas so that a silica sol is formed in a short time simultaneously with the conversion of the sol into a gel in the gas.

Namely, an aqueous alkali metal silicate solution and an aqueous mineral acid solution are introduced into a container equipped with a nozzle from different inlets and uniformly mixed instantaneously to form a silica sol having a pH 7–9 and a concentration of at least 130 g/l in terms of $SiO_2$, and the silica sol is ejected from the nozzle into the medium gas such as air and converts into a gel while it is flying. The falling gel particles dive into an aging tank containing water placed at their landing site and aged for from a few minutes to a few tens minutes. After addition of an acid and washing with water, a spherical silica hydrogel is obtained.

The silica hydrogel is transparent spherical particles having a uniform particle size around from 2 to 10 mm and elasticity and can contain, for example, about 4 times as much water as the weight of $SiO_2$ (i.e., 20 wt % of $SiO_2$ and 80 wt % of water).

The $SiO_2$ concentration of the silica gel used in the present invention is preferably from 15 to 75 mass % (i.e. the water content: from 85 to 25 mass %).

Such a silica hydrogel as the starting material is subjected to hydrothermal treatment in a heating pressure vessel such as an autoclave under heating like a silica sol as previously mentioned, to form tertiary agglomerated particles of silica in the present invention. Though such a spherical silica hydrogel may be used directly, it is preferred to pulverize or roughly pulverized such a spherical silica hydrogel to a particle size of from about 0.1 to 6 mm.

When the silica hydrogel is charged into an autoclave for the hydrothermal treatment, it is preferred to add purified water such as distilled water or deionized water to adjust the silica hydrogel concentration within the desired range. The total silica concentration of the charged liquid in the autoclave is usually from 1 to 30 mass %, preferably from 10 to 20 mass % as $Sio_2$, based on the total amount of the charged starting materials, though its choice depends on the stirring efficiency, the crystal growth rate, the yield, etc. The total silica concentration of the charged liquid means the total concentration in the system and includes, not only silica in the form of a silica hydrogel, but also silica brought in the system in the form of sodium silicate or like used as an alkali metal salt.

It is preferred that the conversion of the silica hydrogel to silica-X or the like by the hydrothermal treatment is promoted by incorporation of an alkali metal salt because a pH shift of the charged liquid towards the alkaline side increases the solubility of silica moderately to allow faster precipitation attributable to the so-called Ostwald ripening.

Here, the alkali metal salt means an alkali metal hydroxide, an alkali metal silicate or an alkali metal carbonate. As the alkali metal, Li, Na or K is preferred. The pH of the system is preferably at least pH 7, more preferably from pH 8 to pH 13, particularly preferably from pH 9 to pH 12.5.

The amount of the alkali, in terms of the silica/alkali molar ratio ($SiO_2/Me_2O$, wherein M is an alkali metal), is preferably within a range of from 4 to 15 mol/mol, more preferably within a range of from 7 to 13 mol/mol. As mentioned above, silica is represented by the total amount of the silica in the charged liquid in the system and includes the silica brought in the system in the form of sodium silicate or the like, in addition to the silica brought in the form of the silica hydrogel.

The hydrothermal treatment is carried out within a temperature range of from 150 to 220° C., preferably from 160 to 200° C., most preferably from 170 to 195° C.

The time required for the hydrothermal treatment varies depending upon the temperature of the hydrothermal treatment or presence or absence of seed crystals, but usually, it is from 3 to 50 hours, preferably from 5 to 40 hours, more preferably from 5 to 25 hours, most preferably from 5 to 12 hours.

Though it is not essential, addition of seed crystals in an amount of from about 0.001 to 1 mass %, based on the amount of the silica hydrogel charged as the starting material is preferable to carry out the hydrothermal treatment efficiently and to shorten the treating time. As is the case with a silica sol, as the seed crystals, silica-X, silica-Y or the like may be used as it is or after pulverization as the case requires.

After completion of the hydrothermal treatment, like in the case with a silica sol, the treatment product is taken out from the autoclave, filtered and washed with water, and then the pH is adjusted.

Observation of the particles constituting a cake of the hydrothermal treatment product obtained by hydrothermally treating a silica sol or a silica hydrogel, as described above after filtration and washing with water under a scanning electron microscope (hereinafter referred to simply as "SEM") demonstrates that foliar secondary particles overlie one on another to form ternary particles in the form of porous three-dimensional disorderly agglomerates. Such agglomerated particles are the tertiary agglomerated particles of silica in the present invention.

However, as will be described later, the extremely thin flaky primary particles can not be identified under a SEM, but foliar secondary particles each of which is formed by a parallel face-to-face alignment of a plurality of extremely thin flaky primary particles which are overlaid one on another, can be identified. In contrast, flaky primary particles thin enough to transmit electron rays partially can be identified under a transmission electron microscope (hereinafter referred to simply as "TEM"). Such foliar secondary particles are the foliar secondary silica particles in the present invention each of which can be identified as formed by a parallel face-to-face alignment of a plurality of flaky primary particles which are overlaid one on another. It is extremely difficult to peel and isolate the flaky primary particles as constituting units one by one from the foliar secondary particles constituted by the primary particles which are overlaid one on another in layers. Namely, in the layered overlaid structure, the layers of the primary particles are completely integrated by the extremely firm interlayer bonding. Thus, it is difficult to disintegrate the foliar secondary particles of the present invention into primary particles any more.

Observation of ultra thin specimens of a fine powder made of foliar secondary silica particles embedded in an epoxy resin and cut with an ultramicrotome under a TEM reveals that the thickness of flaky primary particles was found to be extremely thin at a level of from 1 to 10 nm.

Though the foliar secondary silica particles are mostly composed of orderly alignments of parallel layers of such flaky particles, but contain spaces of from 1 to 100 nm wide due to partial disorder in the layer alignment.

It is also possible to prepare the tertiary agglomerated particles of silica in the present invention from hydrous silicic acid (such as so-called white carbon) as well as a silica sol or a silica hydrogel as the starting material by a similar method.

Disintegration and Dispersion of the Tertiary Agglomerated Particles Silica

In the present invention, the tertiary agglomerated particles of silica prepared as described above, are disintegrated and dispersed in an organic polymer in the form of an aqueous emulsion by a wet method.

Though it is basically possible to obtain foliar secondary silica particles by disintegrating and dispersing tertiary agglomerated particles of silica in an aqueous slurry by a wet method as previously proposed by the present inventors, it is impossible to obtain sufficiently small foliar secondary silica particles with high sedimentation resistance by repeating such disintegration and dispersion as described previously. In contrast, the present invention is characterized in that tertiary agglomerated particles of silica are disintegrated and dispersed into fine particles in the presence of an organic polymer in the form of an aqueous emulsion by a wet method.

The organic polymer in the form of an aqueous emulsion may be an aqueous emulsion of any film-forming organic polymer such as at least one homopolymer resin selected from the group consisting of an acrylic resin type, an epoxy resin type, a urethane resin type, a styrene resin type, a silicon resin type, a fluorine resin type, a vinyl chloride resin type and a polyester resin type for use in paints and coatings, a copolymer resin made of at least two types of them, or a mixture or composite of at least two types of such homopolymer resins and copolymer resins, without any particular restriction.

The particles of the organic polymer in the form of an aqueous emulsion may be in symmetric shapes like spheres or in asymmetric shapes, but a spherical shape is most preferable. The average particle size of the organic polymer is preferably from 1 to 300 nm, more preferably from 10 to 200 nm.

The ratio of the organic polymer:the tertiary agglomerated particles of silica present in the liquid before wet disintegration, i.e., in the liquid to be fed to a disintegrator is preferably 2–98 mass %:98–2 mass %, more preferably 20–80 mass %:80–20 mass %, most preferably 30–70 mass %:30–70 mass %, on a solid basis. If the amount of the organic polymer is smaller than this range, the tertiary agglomerated particles of silica can not disintegrate into sufficiently fine secondary silica particles. If the amount of the organic polymer is too large, the secondary silica particle content of the resulting hardenable composition is too low to sufficiently improve the properties of coating films such as hardness and adhesion.

The organic polymer concentration of the liquid containing the tertiary agglomerated particles of silica and the organic polymer in the form of an aqueous emulsion to be subjected to the wet disintegration is preferably from 1 to 70 mass % on a solid basis.

The coexistence of the organic polymer in the form of an aqueous emulsion with the tertiary agglomerated particles of silica can be attained by repulping a wet cake of the tertiary agglomerated particles of silica obtained by the above-mentioned hydrothermal treatment followed by filtration and washing with water, with water to form a slurry, and admixing the slurry with the organic polymer in the form of an aqueous emulsion. It is also possible to dry the aqueous slurry obtained by repulping tertiary agglomerated particles of silica with water once with a medium fluidized bed dryer or the like to a dry powder of tertiary agglomerated particles of silica and then admix the powder with the organic polymer in the form of an aqueous emulsion.

For the wet disintegration, a wet system pulverizing apparatus (disintegrator) which mechanically stirs grinding material at high speed such as a wet bead mill or a wet ball mill is preferably used. It is desirable that the disintegration and dispersion is so carried out that tertiary agglomerated particles of scaly silica disintegrate into foliar secondary silica particles while crushing and destruction of foliar secondary silica particles are minimized. From this standpoint, it is preferred to use a wet bead mill employing medium beads made of zirconia or alumina having a diameter of from 0.2 to 1.0 mm.

The liquid mixture of tertiary agglomerated particles of silica and an organic polymer in the form of an aqueous emulsion to be subjected to wet disintegration prepared as described above, is supplied to such a wet disintegrator as described above to disintegrate the tertiary agglomerated particles of scaly silica into secondary particles.

The resulting slurry is available as the hardenable composition of the present invention with high storage stability which is substantially free from tertiary particles and contains foliar secondary silica particles composed of parallel face-to-face alignments of a plurality of flaky primary particles which are overlaid one on another and an organic polymer in the form of an aqueous emulsion in a highly dispersed state.

It is possible to confirm by particle size analysis using a laser diffraction/light scattering particle size distribution analyzer (such as LA-920 model, manufactured by Horiba Seisakusho K.K.) that the foliar secondary silica particles in the hardenable composition as described above are extremely fine particles disintegrated to a level of from 20 to 1000 nm.

FIG. 1 is a transmission electron micrograph of the hardenable composition containing resin particles of an acrylic resin aqueous emulsion and foliar secondary silica particles, prepared in Example 4 as described later. The fine spherical organic polymer emulsion particles A in and the foliar secondary particles of scaly silica B are clearly distinguishable. Specifically speaking, the secondary silica particles are in foliar shapes having sectional diameters of about 50 to 800 nm and composed of several flaky primary particles each having a thickness of about from 1 to 10 nm which are overlaid one on another, according to TEM observation. The sizes of the organic polymer particles are about from 20 to 200 nm under a TEM.

In addition of the foliar secondary silica particles, some single flaky primary particles (which are not overlaid) are also found among the foliar secondary silica particles.

In addition to the above-mentioned method, the hardenable composition with high storage stability containing scaly silica particles which consist essentially of foliar secondary silica particles and have a laminated structure can also be prepared by wet disintegrating and dispersing the tertiary agglomerated particles of silica in the absence of organic polymer particles by a wet method and then disintegrating and dispersing the resulting foliar secondary silica particles in the presence of an organic polymer in the form of an aqueous emulsion by a wet method as described above.

Foliar Secondary Silica Particle

The scaly particulate silica is available in the new particle form developed by the present inventors and consists essentially of foliar secondary silica particles, each of which individually has a laminated structure formed by a parallel face-to-face alignment of a plurality of flaky primary particles which are overlaid one on another. Now, their characteristic physical properties are recited below.

Their particle size is usually about from 1 to 1000 nm, preferably about from 10 to 1000 nm in the present invention, though it is not particularly restricted. The particle size may be measured appropriately depending on the particle size distribution with a laser diffraction/scattering particle size distribution analyzer (such as LA-920 model, manufactured by Horiba Seisakusho K.K.), a dynamic light-scattering particle size distribution analyzer (such as LB-500 model, manufactured by Horiba Seisakusho K.K.) or a Coulter counter (such as MA-II model, manufactured by Coulter Electronics Company).

The fundamental physical properties of the foliar secondary silica particles of the present invention are as follows.

The X-ray diffraction spectrum of the secondary particles of the silica indicates that the silica comprises silica-X characterized by the main peaks at $2\theta=4.9°, 26.0°$ and $28.3°$ corresponding to ASTM (American Society for Testing and Materials) card No. 16-0380 (hereinafter referred to simply as ASTM card) registered in the USA, and/or silica-Y characterized by the main peaks at $2\theta=5.6°, 25.8°$ and $28.3°$, corresponding to ASTM card No. 31-1233. As other peaks, peaks of ASTM card Nos. 31-1234 and 37-0386 are observed in the case of silica-X, and peaks of ASTM card Nos. 35–63 and 25-1332, are observed in the case of silica-Y.

The saturated solubility at 20° C. of the silica in an aqueous acid solution and in an aqueous alkali solution is low. The solubility of the silica, in terms of the $SiO_2$ concentration, is 0.008 mass % in 10 mass % aqueous HCl, 0.006 mass % in deionized water, 0.55 mass % in 5 mass % aqueous NaOH and 0.79 mass % in 10 mass % aqueous NaOH. The low solubility in both an acid and an alkali means acid and alkali resistance. Especially, as compared with silica gel or colloidal silica, the silica has a very small solubility in an aqueous alkali solution, and thus has good alkali resistance.

In the present invention, it is particularly preferred that the scaly silica particles are made of so-called polysilicic acid or its metal salt. Here, the layered polysilicic acid is defined as having a silicate layer structure having $SiO_4$ tetrahedrons as the sole primary structural units.

Silica-X and silica-Y, which were mentioned above, were first reported by A. Heydemann and B. A. Mitsyuk, named by them, and in later years, found to fall into the category called layered polysilicic acid and its salts.

Layered polysilicic acid and its salts include, for example, silica-X, silica-Y, kenyaite, magadiite, makatite, ilerite, kanemite and octosilicate, and are comprehensively mean the H-type obtained by acid treatment of a layered polysilicate through replacement of the alkali metal in the silicate with hydrogen ions and the salt type in the form of salts with alkali metals prior to the acid treatment.

In the present invention, both the H-type layered polysilicic acid and the layered polysilicate of an alkali metal salt type may be employed. However, by comparison, the layered polysilicate of an alkali metal salt type has a highly alkaline pH, while the H-type layered polysilicic acid has a nearly neutral pH. Accordingly, in the present invention, the H-type layered polysilicic acid is more suitable.

With respect to preferable layered polysilicic acid of the H-type, the acidity measured by a titration using an aqueous solution of sulfuric acid, hydrochloric acid, sodium hydroxide or sodium chloride as the titrant solution as disclosed, for example, in JP-A-60-161319 (in terms of the amount of $H^+$ ions as the titrand expressed in millimoles per mol of $SiO_2$), is preferably about from 0.01 to 70 mmol $H^+$/mol $SiO_2$, more preferably about from 0.01 to 50 mmol $H^+$/mol $SiO_2$, most preferably about from 0.01 to 20 mmol $H^+$/mol $SiO_2$.

The residual sodium in a layered polysilicate, expressed in mass ppm per unit mass of $SiO_2$ is preferably about from 1 to 27000 ppm, more preferably about from 1 to 20000 ppm, most preferably about from 1 to 8000 ppm.

The above-mentioned layered polysilicic acid is usually in the form of tertiary particles of silica which are porous three-dimensional disorderly agglomerates of scaly particles which are actually secondary particles each of which is formed by flaky primary particles which are overlaid one on another, and therefore, it is preferably used in the form of an aqueous slurry in the mechanical disintegration into foliar secondary particles previously proposed by the present inventors. Among the foliar secondary silica particles obtained from layered polysilicic acid, silica-X, silica-Y, H-type kenyaite and H-type magadiite are most preferable for the present invention.

The reason why the presence of an organic polymer in the form of an aqueous emulsion facilitates reduction of foliar secondary silica particles into fine particles during disintegration into foliar secondary silica particles by a high-speed stirring wet system pulverizing apparatus (disintegrator) is assumed as follows. Namely, the organic polymer is present in the form of plastic fine particles, usually spherical, having particles sizes of from 1 to 300 nm among the secondary silica particles. The particles of the organic polymer are much smaller than the secondary silica particles, as FIG. 1 demonstrates.

The foliar secondary silica particles in the present invention are laminates of flaky primary particles which are bonded so firm that they are basically difficult to separate. However, the flaky primary particles are not totally flat and have some waves and twists. Therefore, the laminated structure is partly disordered and has plenty of voids of about from 1 to 100 nm in size between layers. It is supposed that during disintegration, organic polymer particles bounced off the medium beads bump into the foliar secondary silica particles and squeeze into the voids in the laminated structure, enlarging the spaces between the disorderly laminated layers. In other words, the organic polymer particles serves as wedges in the voids to relatively efficiently pry open the orderly laminated layers too.

Now, the present invention will be described in further detail with reference to Examples.

PREPARATION EXAMPLE 1

Preparation of Tertiary Agglomerated Particles of Silica from a Silica Hydrogel

A silica hydrogel as the starting material was prepared as follows by using sodium silicate as the alkali source. 2,000 ml/min of an aqueous sodium silicate solution having a $SiO_2$ concentration of 21.0 mass % with $SiO_2/Na_2O=3.0$ (molar ratio) and an aqueous sulfuric acid solution having a sulfuric acid concentration of 20.0 mass %, were introduced from separate inlets into a container equipped with a nozzle and instantaneously uniformly mixed. The ratio of the flow rates of the two solutions was so adjusted that the pH of the effluent ejected from the nozzle into air would be from 7.5 to 8.0, and the uniformly mixed silica sol liquid was continuously ejected into the air from the nozzle. The effluent formed spherical droplets in the air and turned into a gel in about a second while they fell down in the air parabolically. The falling droplets dove into an aging tank containing water placed at their landing site and aged.

The aging was followed by a pH adjustment to 6 and sufficient washing with water to give a silica hydrogel. The silica hydrogel particles were spherical in shape and had an average particle size of 6 mm. The mass ratio of water to $SiO_2$ in the silica hydrogel particles was 4.55, and the residual sodium in the silica hydrogel particles was 110 ppm.

The silica hydrogel particles were roughly pulverized with a double roll crusher to an average particle size of 2.5 mm and subjected to hydrothermal treatment for use in preparation of tertiary agglomerated particles of scaly silica.

Into an autoclave (equipped with electric heating and anchor type mixing blades) having a capacity of 50,000 ml, 23.7 kg of the silica hydrogel ($SiO_2$: 18 mass %) having a particle size of 2.5 mm and 5.5 kg of an aqueous sodium silicate solution ($SiO_2$: 28.75 mass %, $Na_2O$: 9.3 mass %, $SiO_2/Na_2O=3.17$ (mol ratio)) were charged so that the total $SiO_2/Na_2O$ molar ratio of the system would be 12.0. Then, 10.7 kg of deionized water was added thereto, and hydrothermal treatment was carried out at 185° C. for 8 hours with stirring at a rotational speed of 50 rpm. The total silica concentration in the system was 15 mass % in terms of $SiO_2$.

After the hydrothermal treatment, the resulting slurry was filtered with water by means of a filter cloth type vertical centrifugal separator (TU-18 model, manufactured by Toko Kikai K.K.), to give a wet cake of silica having a water content of 69.7 mass % (solid content: 30.3 mass %).

The wet cake was repulped with water to give a silica slurry having a $SiO_2$ concentration of 7.0 mass %. The silica slurry was dried at a hot air temperature of 300° C. by means of a medium fluidized bed dryer (SFD-MINI model, manufactured by Ogawara Seisakusho K.K.) to give 5.6 kg of a dried fine powder.

Phase analysis of the resulting fine powder by powder X-ray diffraction spectrometry showed in addition to the main peaks attributable to silica-X at 2θ=4.9° and 26.0° which correspond to ASTM card No. 16-0380, peaks corresponding to ASTM cards Nos. 31-1234 and 37-0386.

The morphological investigation of the resulting particles under a TEM revealed that each foliar secondary silica particle was formed by a parallel face-to-face alignment of a plurality of flaky primary particles of the scaly silica which are overlaid one on another.

However, when the particles were viewed under a SEM, the morphology of the primary particles was not visible, and the foliar silica secondary particles looked as if they had been primary particles. The foliar particles were scaly in shape and shown to overlie one on another to form ternary particles in the form of three-dimensional disorderly agglomerates having numerous spaces (voids or pockets). Such agglomerated particles were identified as the tertiary agglomerated particles of silica in the present invention.

When viewed under a SEM, the foliar particles (identified as secondary particles under a TEM) had an average thickness of 0.06 μm, an average longitudinal length of 5.4 μm, a longitudinal aspect ratio of 90, an average transversal length of 1.6 μm and a transversal aspect ratio of 27.

The average particle size of the fine powder (tertiary agglomerated particles of silica) was measured with a Coulter counter (MAII model, manufactured by Coulter Electronics Company; aperture tube diameter: 50 μm (the same applies to the subsequent Preparation Examples and Examples)) and found to be 6.1 μm.

PREPARATION EXAMPLE 2

Preparation of Tertiary Agglomerated Particles of Silica from a Silica Hydrogel

A silica hydrogel as the starting material was prepared as follows by using NaOH as the alkali source. 2,000 ml/min of an aqueous sodium silicate solution having a $SiO_2$ concentration of 21.0 mass % with $SiO_2/Na_2O$=3.0 (molar ratio) and an aqueous sulfuric acid solution having a sulfuric acid concentration of 20.0 mass %, were introduced from separate inlets into a container equipped with a nozzle and instantaneously uniformly mixed. The ratio of the flow rates of the two solutions was so adjusted that the pH of the effluent ejected from the nozzle into air would be from 7.5 to 8.0, and the uniformly mixed silica sol liquid was continuously ejected into the air from the nozzle. The effluent formed spherical droplets in the air and turned into a gel in about a second while they fell down in the air parabolically. The falling droplets dove into an aging tank containing water placed at their landing site and aged.

The aging was followed by a pH adjustment to 6 and sufficient washing with water to give a silica hydrogel. The silica hydrogel particles were spherical in shape and had an average particle size of 6 mm. The mass ratio of water to $SiO_2$ in the silica hydrogel particles was 4.38, and the residual sodium in the silica hydrogel particles was 112 ppm.

The silica hydrogel particles were roughly pulverized with a double roll crusher to an average particle size of 2.5 mm and subjected to hydrothermal treatment for use in preparation of tertiary agglomerated particles of scaly silica.

Into an autoclave (equipped with electric heating and anchor type mixing blades) having a capacity of 5,000 ml, 2,688 g of the silica hydrogel ($SiO_2$: 18.6 mass %) having a particle size of 2.5 mm and 126 g of an aqueous NaOH solution (NaOH: 48.5 mass %) were charged so that the total $SiO_2/Na_2O$ molar ratio of the system would be 11.0. Then, 1186 g of deionized water and 0.5 g of seed crystals were added thereto, and hydrothermal treatment was carried out at 180° C. for 12 hours with stirring at a rotational speed of 20 rpm. The total silica concentration in the system was 12.5 mass % in terms of $SiO_2$.

After the hydrothermal treatment, the resulting slurry was filtered with water by means of a filter cloth type vertical centrifugal separator (TU-18 model, manufactured by Toko Kikai K.K.), to give a wet cake of silica having a water content of 66.7 mass % (solid content: 30.3 mass %).

The wet cake was repulped with water to give a silica slurry having a $SiO_2$ concentration of 7.0 mass %. The silica slurry was dried at a hot air temperature of 300° C. by means of a medium fluidized bed dryer (SFD-MINI model, manufactured by Ogawara Seisakusho K.K.) to give 408 g of a dried fine powder.

Phase analysis of the resulting fine powder by powder X-ray diffraction spectrometry showed in addition to the main peaks attributable to silica-Y at 2θ=5.6° and 25.8° which correspond to ASTM card No. 31-1233, peaks corresponding to ASTM cards Nos. 35–63 and 25-1332.

The morphological investigation of the resulting particles under a TEM revealed that each foliar secondary silica particle was formed by a parallel face-to-face alignment of a plurality of flaky primary particles of the scaly silica which are overlaid one on another.

However, when the particles were viewed under a SEM, the morphology of the primary particles was not visible, and the foliar silica secondary particles looked as if they had been primary particles. The foliar particles were scaly in shape and shown to overlie one on another to form ternary particles in the form of three-dimensional disorderly agglomerates having numerous spaces (voids or pockets). Such agglomerated particles were identified as the tertiary agglomerated particles of silica in the present invention.

When viewed under a SEM, the foliar particles (identified as secondary particles under a TEM) had an average thickness of 0.07 μm, an average longitudinal length of 6.0 μm, a longitudinal aspect ratio of 86, an average transversal length of 1.8 μm and a transversal aspect ratio of 26.

The average particle size of the fine powder (tertiary agglomerated particles of silica) was measured with a Coulter counter (MAII model, manufactured by Coulter Electronics Company) and found to be 6.5 μm.

EXAMPLE 1

Preparation of a Hardenable Composition Containing Foliar Secondary Silica Particles from the Wet Cake of Tertiary Agglomerated Particles of Silica Obtained in Preparation Example 1

(1) 1650 g of the wet cake of tertiary agglomerated particles of silica (solid content: 30.3 mass %) obtained in Preparation Example 1 after the filtration and washing with water by a centrifugal separator was repulped with deionized water, and then the pH was adjusted with an aqueous sodium hydroxide solution to obtain 3333 g of an aqueous slurry of tertiary agglomerated particles of silica (solid content 15 mass %, pH: 8.5). The average particle size of the slurry measured with a Coulter counter was 7.2 μm, and the viscosity measured with a B-type viscometer was 0.010 Pa·s. The water in the slurry was evaporated to dryness, and the silica and sodium in the dry solid were measured. The amount of sodium per unit mass of $SiO_2$ was 13200 ppm.

(2) 3333 g of the aqueous slurry of tertiary agglomerated particles of silica was stirred with 1667 g of a urethane resin aqueous emulsion (product name: HUX-350, solid resin content: 30 mass %, pH: 8.5) manufactured by Asahi Denka Kogyo K.K. in a mixing tank equipped with mixing blades to give a mixed slurry.

The slurry was circulated continuously through a stirring medium beads mill (Dyno mill KDL-PILOT model A, manufactured by Shinmaru Enterprises Co. (vessel capacity: 1.4 L, filled 70% with zirconia beads having a diameter of 0.5 mm)) at a shaft rotational speed of 3,400 rpm at a flow rate of 10 L/h for 7 hours to disintegrate and disperse the tertiary agglomerated particles of silica in the presence of the urethane resin as the organic polymer in the form of an aqueous emulsion to foliar secondary silica particles.

After the disintegration and dispersion, the resin content of the aqueous slurry was 11.3 mass %, the foliar secondary silica particle content was 11.3 mass %, and the ratio of resin:silica was 50%:50% on a solid basis.

(3) When the aqueous slurry was viewed under a TEM after the disintegration and dispersion, there were substantially no tertiary agglomerated particles, and only secondary particles were recognized. The particle size of the particles in the slurry was measured with a laser diffraction/scattering particle size distribution analyzer (LA-920 model, manufactured by Horiba Seisakusho K.K.) on an assumption that the relative refractive index of silica was 1.10 (based on the refractive index of water), and the average particle size of the particles containing foliar secondary silica particles was 130 nm. The viscosity of the slurry measured with a B-type viscometer was 0.047 Pa·s. The particle sizes of the particles containing foliar secondary silica particles ranged from 50 to 1000 nm.

(4)

① The slurry obtained after the disintegration and dispersion, i.e., the hardenable composition containing foliar secondary silica particles, was stationarily stored at 35° C. for 90 days and examined on hot storage stability in accordance with the procedure stipulated in JIS K5400. When the slurry was examined after the stationary storage, no deposition of silica on the bottom of the container was recognized.

② The hardenable composition was spread on a glass sheet (soda-lime glass, 70 mm×150 mm×2 mm thick) by bar coating (JIS K5400) by means of a #80 bar coater (manufactured by Eto Kikai K.K.) before or after the hot storage stability test and dried at room temperature for 24 hours to give a test specimen of a dry hardened coating films. The coating amount was about 20 g/m$^2$ on a solid basis.

The dry hardened coatings obtained from the hardenable composition before and after the hot storage stability test, and the coating films obtained from the composition before and after the hot storage stability test were both flat and did not differ in appearance.

③ The hardenable composition before and after the hot storage stability test was examined by the pencil hardness test and the cross cut test in accordance with JIS K5400 (the same applies to the subsequent Example).

The transparencies of the coating films were measured with a hazemeter (Nippon Denshoku Industries Co., Ltd., turbidimeter, NPH-2000 model) (the same applies to the subsequent Examples).

The results are shown in Table 1.

TABLE 1

| | Pencil hardness | Cross cut test | haze |
|---|---|---|---|
| Before hot storage stability test | 4H | 10 | 16.93 |
| After hot storage stability test | 4H | 10 | 16.91 |

As is evident from the Table, the results that the pencil hardness and the cross-cut-peeling resistance (adhesion) were not deteriorated after the storage indicate stable film-forming property. The result that the haze was not deteriorated indicates that the secondary particles were orientated in the coating film without morphological destruction of the laminated structure of the secondary particles.

EXAMPLE 2

Preparation of a Hardenable Composition Containing Foliar Secondary Silica Particles from the Wet Cake of Tertiary Agglomerated Particles of Silica Obtained in Preparation Example 2

(1) 1500 g of the wet cake of tertiary agglomerated particles of silica (solid content: 33.3 mass %) obtained in Preparation Example 2 after the filtration and washing with water by a centrifugal separator was repulped with deionized water, and then the pH was adjusted with an aqueous sodium hydroxide solution to obtain 3333 g of an aqueous slurry of tertiary agglomerated particles of silica (solid content 15 mass %, pH: 8.5). The average particle size of the slurry measured with a Coulter counter was 7.2 µm, and the viscosity measured with a B-type viscometer was 0.010 Pa·s. The water in the slurry was evaporated to dryness, and the silica and sodium in the dry solid were measured. The amount of sodium per unit mass of $SiO_2$ was 13000 ppm.

(2) 3333 g of the aqueous slurry of tertiary agglomerated particles of silica was stirred with 1000 g of an acrylic resin aqueous emulsion (product name: Boncoat 4001, solid resin content: 50 mass %, pH: 8.4) manufactured by Dainipppon Ink and Chemicals. Inc., and 667 g of deionized water in a mixing tank equipped with mixing blades to give a mixed slurry.

The slurry was circulated continuously through a stirring medium beads mill (Dyno mill KDL-PILOT model A, manufactured by Shinmaru Enterprises Co. (vessel capacity: 1.4 L, filled 70% with zirconia beads having a diameter of 0.5 mm)) at a shaft rotational speed of 3,400 rpm at a flow rate of 10 L/h for 2 hours to disintegrate and disperse the tertiary agglomerated particles of silica in the presence of the acrylic resin as the organic polymer in the form of an aqueous emulsion to foliar secondary silica particles.

After the disintegration and dispersion, the resin content of the aqueous slurry was 11.3 mass %, the foliar secondary silica particle content was 11.3 mass %, and the ratio of resin:silica was 50%:50% on a solid basis.

(3) When the aqueous slurry was viewed under a TEM after the disintegration and dispersion, there were substantially no tertiary agglomerated particles, and only secondary particles were recognized. The particle size of the particles in the slurry was measured with a laser diffraction/scattering particle size distribution analyzer (LA-920 model, manufactured by Horiba Seisakusho K.K.) on an assumption that the relative refractive index of silica was 1.10 (based on the refractive index of water), and the average particle size of the particles containing foliar secondary silica particles was 150 nm. The viscosity of the slurry measured with a B-type viscometer was 0.12 Pa·s. The particle sizes of the particles containing foliar secondary silica particles ranged from 50 to 1000 nm.

(4)
① The slurry obtained after the disintegration and dispersion, i.e., the hardenable composition containing foliar secondary silica particles, was stationarily stored at 35° C. for 90 days and examined on hot storage stability in accordance with the procedure stipulated in JIS K5400. When the slurry was examined after the stationary storage, no deposition of silica on the bottom of the container was recognized.

② The hardenable composition was spread on a glass sheet (soda-lime glass, 70 mm×150 mm×2 mm thick) by bar coating (JIS K5400) by means of a #80 bar coater (manufactured by Eto Kikai K.K.) before or after the hot storage stability test and dried at room temperature for 24 hours to give a test specimen of a dry hardened coating films. The coating amount was about 20 g/m² on a solid basis.

The dry hardened coatings obtained from the hardenable composition before and after the hot storage stability test, and the coating films obtained from the composition before and after the hot storage stability test were both flat and did not differ in appearance.

③ The hardenable composition before and after the hot storage stability test was examined by the pencil hardness test and the cross cut test like in Example 1. The transparencies of the coating films were measured with a hazemeter.

The results are shown in Table 2.

TABLE 2

| | Pencil hardness | Cross cut test | haze |
|---|---|---|---|
| Before hot storage stability test | 4H | 10 | 20.30 |
| After hot storage stability test | 4H | 10 | 20.31 |

As is evident from the Table, the results that the pencil hardness and the cross-cut-peeling resistance (adhesion) were not deteriorated after the storage indicate stable film-forming property. The result that the haze was not deteriorated indicates that the secondary particles were orientated in the coating film without morphological destruction of the laminated structure of the secondary particles.

EXAMPLE 3
Preparation of a Hardenable Composition Containing Foliar Secondary Silica Particles from the Wet Cake of Tertiary Agglomerated Particles of Silica Obtained in Preparation Example 1

(1) 1650 g of the wet cake of tertiary agglomerated particles of silica (solid content: 30.3 mass %) obtained in Preparation Example 1 after the filtration and washing with water by a centrifugal separator was repulped with deionized water, and then the pH was adjusted with an aqueous sodium hydroxide solution to obtain 3333 g of an aqueous slurry of tertiary agglomerated particles of silica (solid content 15 mass %, pH: 10). The average particle size of the slurry measured with a Coulter counter was 7.2 μm, and the viscosity measured with a B-type viscometer was 0.010 Pa·s. The water in the slurry was evaporated to dryness, and the silica and sodium in the dry solid were measured. The amount of sodium per unit mass of $SiO_2$ was 16500 ppm.

(2) 3333 g of the aqueous slurry of tertiary agglomerated particles of silica was stirred with 1000 g of a fluorine resin aqueous emulsion (product name: Lumiflon FE4200, solid resin content: 50 mass %, pH: 7.6) manufactured by Asahi Glass Company, Limited, and 667 g of water in a mixing tank equipped with mixing blades to give a mixed slurry.

The slurry was circulated continuously through a stirring medium beads mill (Dyno mill KDL-PILOT model A, manufactured by Shinmaru Enterprises Co. (vessel capacity: 1.4 L, filled 70% with zirconia beads having a diameter of 0.5 mm)) at a shaft rotational speed of 3,400 rpm at a flow rate of 10 L/h for 2 hours to disintegrate and disperse the tertiary agglomerated particles of silica in the presence of the fluorine resin as the organic polymer in the form of an aqueous emulsion to foliar secondary silica particles.

After the disintegration and dispersion, the resin content of the aqueous slurry was 10.8 mass %, the foliar secondary silica particle content was 10.8 mass %, and the ratio of resin:silica was 50%:50% on a solid basis.

(3) When the aqueous slurry was viewed under a TEM after the disintegration and dispersion, there were substantially no tertiary agglomerated particles, and only secondary particles were recognized. The particle size of the particles in the slurry was measured with a laser diffraction/scattering particle size distribution analyzer (LA-920 model, manufactured by Horiba Seisakusho K.K.) on an assumption that the relative refractive index of silica was 1.10 (based on the refractive index of water), and the average particle size of the particles containing foliar secondary silica particles was 150 nm. The viscosity of the slurry measured with a B-type viscometer was 0.029 Pa·s. The particle sizes of the particles containing foliar secondary silica particles ranged from 50 to 1000 nm.

(4)
① The slurry obtained after the disintegration and dispersion, i.e., the hardenable composition containing foliar secondary silica particles, was stationarily stored at 35° C. for 90 days and examined on hot storage stability in accordance with the procedure stipulated in JIS K5400. When the slurry was examined after the stationary storage, no deposition of silica on the bottom of the container was recognized.

② The hardenable composition was spread on a glass sheet (soda-lime glass, 70 mm×150 mm×2 mm thick) by bar coating (JIS K5400) by means of a #80 bar coater (manufactured by Eto Kikai K.K.) before or after the hot storage stability test and dried at room temperature for 24 hours to give a test specimen of a dry hardened coating films. The coating amount was about 20 g/m² on a solid basis.

The dry hardened coatings obtained from the hardenable composition before and after the hot storage stability test, and the coating films obtained from the composition before and after the hot storage stability test were both flat and did not differ in appearance.

③ The hardenable composition before and after the hot storage stability test was examined by the pencil hardness test and the cross cut test like in Example 1. The transparencies of the coating films were measured with a hazemeter.

The results are shown in Table 3.

TABLE 3

| | Pencil hardness | Cross cut test | haze |
|---|---|---|---|
| Before hot storage stability test | 2H | 10 | 25.14 |
| After hot storage stability test | 2H | 10 | 25.13 |

As is evident from the Table, the results that the pencil hardness and the cross-cut-peeling resistance (adhesion)

were not deteriorated after the storage indicate stable film-forming property. The result that the haze was not deteriorated indicates that the secondary particles were orientated in the coating film without morphological destruction of the laminated structure of the secondary particles.

EXAMPLE 4

Preparation of a Hardenable Composition Containing Foliar Secondary Silica Particles from the Wet Cake of Tertiary Agglomerated Particles of Silica Obtained in Preparation Example 1

(1) 1650 g of the wet cake of tertiary agglomerated particles of silica (solid content: 30.3 mass %) obtained in Preparation Example 1 after the filtration and washing with water by a centrifugal separator was repulped with deionized water, and then the pH was adjusted with an aqueous sodium hydroxide solution to obtain 3333 g of an aqueous slurry of tertiary agglomerated particles of silica (solid content 15 mass %, pH: 8.5). The average particle size of the slurry measured with a Coulter counter was 7.2 µm, and the viscosity measured with a B-type viscometer was 0.010 Pa·s. The water in the slurry was evaporated to dryness, and the silica and sodium in the dry solid were measured. The amount of sodium per unit mass of $SiO_2$ was 13200 ppm.

(2) 3333 g of the aqueous slurry of tertiary agglomerated particles of silica was stirred with 2778 g of an acrylic resin aqueous emulsion for floor polish (product name: ACHIEVE, solid resin content: 18 mass %, pH: 8.5) manufactured by JSP Corporation, in a mixing tank equipped with mixing blades to give a mixed slurry.

The slurry was passed continuously through a stirring medium beads mill (Dyno mill KDL-PILOT model A, manufactured by Shinmaru Enterprises Co. (vessel capacity: 1.4 L, filled 70% with zirconia beads having a diameter of 0.5 mm)) at a shaft rotational speed of 3,400 rpm at a flow rate of 10 L/h three times to disintegrate and disperse the tertiary agglomerated particles of silica in the presence of the acrylic resin as the organic polymer in the form of an aqueous emulsion to foliar secondary silica particles.

After the disintegration and dispersion, the resin content of the aqueous slurry was 8.2 mass %, the foliar secondary silica particle content was 8.2 mass %, and the ratio of resin:silica was 50%:50% on a solid basis.

(3) When the aqueous slurry was viewed under a TEM after the disintegration and dispersion, there were substantially no tertiary agglomerated particles, and only secondary particles were recognized. The particle size of the particles in the slurry was measured with a laser diffraction/scattering particle size distribution analyzer (LA-920 model, manufactured by Horiba Seisakusho K.K.) on an assumption that the relative refractive index of silica was 1.10 (based on the refractive index of water), and the average particle size of the particles containing foliar secondary silica particles was 130 nm. The viscosity of the slurry measured with a B-type viscometer was 0.03 Pa·s. The particle sizes of the particles containing foliar secondary silica particles ranged from 50 to 1000 nm.

A sample of the aqueous slurry obtained after the disintegration and dispersion was diluted with pure water 100-fold and sampled on a collodion membrane and examined under a TEM. The resulting transmission electron micrograph is shown in FIG. 1. In the slurry, both spherical granular acrylic resin particles A having particle sizes of about from 20 to 200 nm and foliar secondary silica particles B having sectional diameters of about 50 to 800 nm were observed.

The secondary silica particles were mostly particles composed of several flaky primary particles which are overlaid one on another (each flaky primary particle had a thickness of about from 1 to 10 nm cut into ultra thin specimens with a ultramicrotome). Part of the particles were single flaky silica particles.

(4)

① 100 g of the slurry obtained after the disintegration and dispersion was stirred with 818 g of the acrylic resin aqueous emulsion for floor polish (product name: ACHIEVE, solid resin content: 18 mass %, pH: 8.5) manufactured by JSP Corporation, in a mixing tank equipped with mixing blades to give a dilute mixed slurry preferable for practical use.

The resin content of the dilute aqueous slurry was 16.9 mass %, the foliar secondary silica particle content was 0.9 mass %, and the ratio of resin:silica was 95%:5% on a solid basis. The viscosity of the slurry measured with a B-type viscometer was as low as 0.008 Pa·s.

② The slurry obtained after the disintegration and dispersion, i.e., the hardenable composition containing foliar secondary silica particles, was stationarily stored at 35° C. for 90 days and examined on hot storage stability in accordance with the procedure stipulated in JIS K5400. When the slurry was examined after the stationary storage, no deposition of silica on the bottom of the container was recognized.

③ The hardenable composition was spread on a glass sheet (soda-lime glass, 70 mm×150 mm×2 mm thick) by bar coating (JIS K5400) by means of a #120 bar coater (manufactured by Eto Kikai K.K.) before or after the hot storage stability test and dried at room temperature for 24 hours to give a test specimen of a dry hardened coating films. The coating amount was about 20 g/m² on a solid basis.

The dry hardened coatings obtained from the hardenable composition before and after the hot storage stability test, and the coating films obtained from the composition before and after the hot storage stability test were both flat and did not differ in appearance.

④ The dilute hardenable composition before and after the hot storage stability test was examined by the pencil hardness test and the cross cut test like in Example 1. The transparencies of the coating films were measured with a hazemeter.

The results are shown in Table 4.

TABLE 4

|  | Pencil hardness | Cross Cut test | haze |
|---|---|---|---|
| Before hot storage stability test | F | 10 | 4.60 |
| After hot storage stability test | F | 10 | 4.59 |

As is evident from the Table, the results that the pencil hardness and the cross-cut-peeling resistance (adhesion) were not deteriorated after the storage indicate stable film-forming property. The result that the haze was not deteriorated indicates that the secondary particles were orientated in the coating film without morphological destruction of the laminated structure of the secondary particles.

(5) Since the acrylic resin aqueous emulsion containing secondary silica particles obtained as the dilute hardenable composition in the present Example was supposed to be used as a floor polish, it was examined on hot storage stability. Namely, the dilute composition was examined by the accelerated storage stability test for floor polishes (45° C., 30 days) stipulated in JIS K3920.

After the 30 days of stationary storage at 45° C., no deposition of silica on the bottom of the container was recognized.

COMPARATIVE EXAMPLE 1

(1) 1650 g of the wet cake of tertiary agglomerated particles of silica (solid content: 30.3 mass %) obtained in Preparation Example 1 after the filtration and washing with water by a centrifugal separator was repulped with deionized water, and then the pH was adjusted with an aqueous sodium hydroxide solution to obtain 3333 g of an aqueous slurry of tertiary agglomerated particles of silica (solid content 15 mass %, pH: 8.5). The average particle size of the slurry measured with a Coulter counter was 7.2 $\mu$m, and the viscosity measured with a B-type viscometer was 0.010 Pa·s.

(2) The slurry was passed continuously through a stirring medium beads mill (Dyno mill KDL-PILOT model A, manufactured by Shinmaru Enterprises Co. (vessel capacity: 1.4 L, filled 80% with zirconia beads having a diameter of 0.5 mm)) at a shaft rotational speed of 3,400 rpm at a flow rate of 10 L/h three times to disintegrate and disperse the tertiary agglomerated particles of silica, and as a result an aqueous slurry of foliar secondary silica particles with a solid content of 15 mass % was obtained. The ph of the slurry was 8.5.

The particle size of the fine particles in the slurry after the disintegration and dispersion was measured with a laser diffraction/scattering particle size distribution analyzer (LA-920 model, manufactured by Horiba Seisakusho K.K.) on an assumption that the relative refractive index of silica was 1.10 (based on the refractive index of water), and the average particle size was 540 nm. The viscosity of the slurry measured with a B-type viscometer was 0.1 Pa·s. The particle sizes of the particles containing foliar secondary silica particles ranged from 200 to 3000 nm.

The water in the slurry was evaporated to dryness, and the silica and sodium in the dry solid were measured. The amount of sodium per unit mass of $SiO_2$ was 13200 ppm.

(2) 1000 g of the aqueous slurry of foliar secondary silica particles was stirred with 15833 g of an acrylic resin aqueous emulsion for floor polish (product name: ACHIEVE, solid resin content: 18 mass %, pH: 8.5) manufactured by JSP Corporation, in a mixing tank equipped with mixing blades to give a hardenable composition slurry containing foliar secondary silica particles, and it was diluted to a concentration preferable for practical use, as in Example 4.

The resin content of the slurry was 16.9 mass %, the foliar secondary silica particle content was 0.9 mass %, and the ratio of resin:silica was 95%:5% on a solid basis. The viscosity of the slurry measured with a B-type viscometer was as low as 0.009 Pa·s.

(3) The hardenable composition having a practical concentration was stationarily stored at 35° C. for 90 days and examined on hot storage stability in the same manner as in Example 1. However, after the stationary storage, considerable deposition of silica was observed on the bottom of the container.

(4) Since the hardenable composition containing acrylic resin aqueous emulsion obtained in the Comparative Example was also supposed to be used as a floor polish, it was examined by the accelerated storage stability test for floor polishes (45° C., 30 days) in the same manner as in Example 4.

However, after the 30 days of stationary storage at 45° C., considerable deposition of silica on the bottom of the container was recognized.

According to the present invention, it is possible to provide an aqueous hardenable composition with high storage stability (sedimentation resistance) containing foliar secondary silica particles and an organic polymer and a process for its production.

The entire disclosure of Japanese Patent Application No. 2001-077343 filed on Mar. 19, 2001 including specification, claims, drawing and summary are incorporated herein by reference in its entirety.

What is claimed is:

1. A process for producing a hardenable composition comprising an organic polymer and scaly silica particles which consist essentially of foliar secondary silica particles and have a laminated structure, said process comprising:

subjecting at least one of a silica sol, a silica hydrogel or hydrous silicic acid to hydrothermal treatment in the presence of an alkali metal salt to form tertiary agglomerated particles of the scaly silica particles in the form of porous three-dimensional disorderly agglomerates of foliar secondary silica particles, each secondary particle being formed by a parallel face-to-face alignment of a plurality of flaky primary particles which are overlaid one on another, and disintegrating and dispersing the tertiary agglomerated particles of silica in an organic polymer in the form of an aqueous emulsion by a wet method.

2. The process according to claim 1, wherein the disintegration and dispersion are carried out with a high speed mechanical stirring wet system pulverizing apparatus employing medium beads.

3. The process according to claim 1, wherein the foliar secondary silica particles are a layered polysilicic acid.

4. The process according to claim 1, wherein the main peak in the X-ray diffraction analysis of the foliar secondary silica particles in the hardenable composition corresponds to silica X, silica Y, or both silica X and silica Y.

5. The process according to claim 1, wherein the organic polymer in the form of an aqueous emulsion is at least one homopolymer resin selected from the group consisting of an acrylic resin, an epoxy resin, a urethane resin, a styrene resin, a silicon resin, a fluorine resin, a vinyl chloride resin, a polyester resin, a copolymer resin comprising at least bonded units thereof a mixture thereof, and a composite thereof.

6. A hardenable composition prepared by the process as claimed in claim 1.

7. The process as claimed in claim 1, further comprising filtering and washing after the hydrothermal treatment and before disintegrating and dispersing.

8. The process as claimed in claim 1, wherein the tertiary agglomerated particles of silica are disintegrated and dispersed in an aqueous acrylic resin.

9. A process for producing a hardenable composition comprising an organic polymer and scaly silica particles which consist essentially of foliar secondary silica particles and have a laminated structure, said process comprising:

subjecting at least one of a silica sol, a silica hydrogel or hydrous silicic acid to hydrothermal treatment in the presence of an alkali metal salt to form tertiary agglomerated particles of the scaly silica particles in the form of porous three-dimensional disorderly agglomerates of foliar secondary silica particles, each secondary particle being formed by a parallel face-to-face alignment of a plurality of flaky primary particles which are overlaid one on another, disintegrating and dispersing the tertiary agglomerated particles of scaly silica particles to foliar secondary silica particles by a wet method, and disintegrating and dispersing the foliar secondary silica particles in an organic polymer in the form of an aqueous emulsion by a wet method.

10. The process according to claim 9, wherein the disintegration and dispersion are carried out with a high speed mechanical stirring wet system pulverizing apparatus employing medium beads.

11. The process according to claim 9, wherein the foliar secondary silica particles are a layered polysilicic acid.

12. The process according to claim 9, wherein the main peak in the X-ray diffraction analysis of the foliar secondary silica particles in the hardenable composition corresponds to silica X, silica Y, both silica X and silica Y.

13. The process according to claim 9, wherein the organic polymer in the form of an aqueous emulsion is at least one homopolymer resin selected from the group consisting of an acrylic resin, an epoxy resin, a urethane resin, a styrene resin, a silicon resin, a fluorine resin, a vinyl chloride resin, a polyester resin, a copolymer resin comprising at least two bonded units thereof, a mixture thereof, and a composite thereof.

14. A hardenable composition prepared by the process as claimed in claim 6.

15. The process as claimed in claim 9, further comprising filtering and washing after the hydrothermal treatment and before disintegrating and dispersing.

16. The process as claimed in claim 9, wherein the tertiary agglomerated particles of silica are disintegrated and dispersed in an aqueous acrylic resin.

17. A hardenable composition comprising scaly silica particles having a laminated structure consisting essentially of foliar secondary silica particles each of which is formed by a parallel face-to-face alignment of a plurality of flaky primary particles which are overlaid one on another, and fine particles of an organic polymer dispersed in an aqueous medium.

18. The hardenable composition according to claim 17, wherein the foliar secondary silica particles are a layered polysilicic acid.

19. The hardenable composition according to claim 17, wherein the main peak in the X-ray diffraction analysis of the foliar secondary silica particles in the hardenable composition corresponds to silica X, silica Y, or both silica X and silica Y.

20. The hardenable composition according to claim 17, wherein the organic polymer in the form of an aqueous emulsion is at least one homopolymer resin selected from the group consisting of an acrylic resin, an epoxy resin, a urethane resin, a styrene resin, a silicon resin, a fluorine resin, a vinyl chloride resin, a polyester resin, a copolymer resin comprising at least two bonded units thereof, a mixture thereof, and a composite thereof.

21. The hardenable composition according to claim 17, which is a floor polish composition.

* * * * *